US009194240B2

(12) United States Patent
Blanchard et al.

(10) Patent No.: US 9,194,240 B2
(45) Date of Patent: Nov. 24, 2015

(54) VIBRATION DAMPER COMPRISING A PEG BETWEEN OUTER PLATFORMS OF ADJACENT COMPOSITE-MATERIAL BLADES OF A TURBINE ENGINE ROTOR WHEEL (75) Inventors: Stephane Pierre Guillaume Blanchard, Chartrettes (FR); Thierry Fachat, Moret sur Loing (FR); Patrick Joseph Marie Girard, Saint Fargeau Ponthierry (FR); Clement Roussille, Bordeaux (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 721 days.

(21) Appl. No.: 13/521,587

(22) PCT Filed: Jan. 11, 2011

(86) PCT No.: PCT/FR2011/050038
§ 371 (c)(1),
(2), (4) Date: Sep. 17, 2012

(87) PCT Pub. No.: WO2011/086313
PCT Pub. Date: Jul. 21, 2011

(65) Prior Publication Data
US 2012/0328415 A1 Dec. 27, 2012

(30) Foreign Application Priority Data
Jan. 13, 2010 (FR) ...................................... 10 50201

(51) Int. Cl.
F01D 5/22 (2006.01)
F01D 5/26 (2006.01)

(52) U.S. Cl.
CPC  *F01D 5/225* (2013.01); *F01D 5/26* (2013.01); *F05B 2240/33* (2013.01); *F05D 2260/96* (2013.01); *F05D 2300/2261* (2013.01); *F05D 2300/603* (2013.01); *Y02T 50/672* (2013.01)

(58) Field of Classification Search
CPC ............... F01D 5/00; F01D 5/10; F01D 5/12; F01D 5/16; F01D 5/26; F01D 25/00; F01D 25/04; F01D 25/06; F01D 5/22; F01D 5/225; F05D 2260/96
USPC ....................................... 416/194, 195, 196 R
See application file for complete search history.

(56) References Cited

U.S. PATENT DOCUMENTS 3,752,599 A     8/1973  Pace
3,990,813 A    11/1976  Imai et al.
(Continued)

FOREIGN PATENT DOCUMENTS

EP     0 806 545     11/1997
EP     1 477 634     11/2004
(Continued)

OTHER PUBLICATIONS

International Search Report Issued Jun. 1, 2011, in PCT/FR11/50038 Filed Jan. 11, 2011.
(Continued)

*Primary Examiner* — Sean J Younger
(74) *Attorney, Agent, or Firm* — Oblon, McClelland, Maier & Neustadt, L.L.P.

(57) ABSTRACT

A vibration damper between outer platforms of adjacent composite-material blades of a turbine engine rotor wheel, the damper including a peg having a substantially spherical portion at each of its two ends, and two hollow inserts for being received in tangential cavities that are provided facing each other in outer platforms of two adjacent composite-material blades of a turbine engine rotor wheel, each spherical portion of the peg coming to bear with point contact against the inside of one of the inserts.

12 Claims, 5 Drawing Sheets

(56) References Cited

U.S. PATENT DOCUMENTS

| | | | |
|---|---|---|---|
| 4,497,611 A * | 2/1985 | Keller | 415/191 |
| 5,158,430 A * | 10/1992 | Dixon et al. | 415/134 |
| 5,730,584 A | 3/1998 | Dodd | |
| 6,648,332 B1 * | 11/2003 | Burdgick | 277/303 |
| 7,572,098 B1 * | 8/2009 | Johnson | 415/119 |
| 7,887,286 B2 * | 2/2011 | Abgrall et al. | 415/119 |
| 2004/0228731 A1 | 11/2004 | Lagrange et al. | |
| 2005/0158171 A1 | 7/2005 | Carper et al. | |
| 2007/0072007 A1 | 3/2007 | Carper et al. | |
| 2010/0034657 A1 | 2/2010 | Hunt et al. | |
| 2010/0202888 A1 * | 8/2010 | Miller | 416/190 |
| 2011/0081235 A1 * | 4/2011 | Shah et al. | 415/170.1 |

FOREIGN PATENT DOCUMENTS

| | | |
|---|---|---|
| EP | 1 555 391 | 7/2005 |
| GB | 2 441 865 | 3/2008 |
| GB | 2 449 493 | 11/2008 |
| JP | 2003 148105 | 5/2003 |

OTHER PUBLICATIONS

U.S. Appl. No. 13/574,926, filed Jul. 24, 2012, Fachat, et al.

* cited by examiner

VIBRATION DAMPER COMPRISING A PEG BETWEEN OUTER PLATFORMS OF ADJACENT COMPOSITE-MATERIAL BLADES OF A TURBINE ENGINE ROTOR WHEEL

BACKGROUND OF THE INVENTION

The present invention relates to the general field of composite-material blades for a turbine engine rotor wheel. The invention relates more particularly to damping the vibration that appears in operation between the outer platforms of two adjacent blades of a rotor wheel.

A turbine engine rotor wheel, e.g. a rotor wheel of a low-pressure turbine stage of a turbojet, comprises a disk having a plurality of blades mounted thereon. At their free radial ends, each blade has a transverse element referred to as an outer platform, which element serves in particular to define the outside of the flow passage for the gas stream passing through the turbine.

The outer platform of such a blade has an upstream edge and a downstream edge extending perpendicularly to the flow direction of the gas stream. These edges are connected together via two side edges via which the outer platform of the blade comes into contact with the outer platforms of the two blades of the rotor wheel that are directly adjacent thereto.

In general, with metal blades, the side edges have a so-called "Z-profile", i.e. each of them has two axial portions that are interconnected by a portion that is substantially transverse. In order to damp the vibration to which they are subjected while the turbine is in operation, it is known to mount the blades on the disk with a certain amount of twist about their main axes. At the outer platform of any one particular blade, this twist stress serves to put the transverse portions of the outer platform of the blade into contact with the transverse portions of the outer platforms of the adjacent blades. The contact and friction forces as generated in this way at the outer platforms of the blades serve to dissipate the vibratory energy resulting from operation of the turbine.

Such vibration damping is nevertheless not applicable to rotor wheels in which the blades are made of composite material. In particular for a ceramic matrix composite (CMC) blade the stresses generated by twisting the blade are excessive compared with the capacity of the composite material. Furthermore, having recourse to blades that are made of composite material also has the drawback of giving rise to large radial offsets or to large displacements between the outer platforms of adjacent blades in the event of mutual tilting between the blades.

OBJECT AND SUMMARY OF THE INVENTION

A main object of the present invention is thus to mitigate such drawbacks by proposing to damp vibration between the outer platforms of adjacent composite-material blades effectively without giving rise to excessive stresses in the blades.

This object is achieved by a vibration damper between outer platforms of adjacent composite-material blades of a turbine engine rotor wheel, the damper comprising a peg having a substantially spherical portion at each of its two ends, and two hollow inserts for being received in tangential cavities that are provided facing each other in the outer platforms of two adjacent composite-material blades of a turbine engine rotor wheel, each spherical portion of the peg coming to bear with point contact against the inside of one of the inserts.

In operation, the spherical portions of the pegs rub against the walls of the inserts against which they come to bear. This rubbing thus serves to dissipate the vibratory energy associated with the rotation of the rotor wheel. No stress is applied to the blades in order to obtain such energy dissipation. The lifetime of the blades is thus increased. In the event of blades tilting mutually, such a vibration damper also makes it possible to accommodate large amounts of radial offset between the outer platforms of the blades. Furthermore, the damper does not degrade the performance of the rotor wheel (the flow passage for the gas stream passing through the wheel is not modified by the presence of the damper). The damper is thus easy to mount and to disassemble and the additional mass is small.

In an advantageous arrangement, the mass of the peg lies in the range 2% to 6%—and preferably corresponds to 5%—of the mass of the blade having an insert mounted therein.

In another advantageous arrangement, the damper further includes means for locking one of the spherical portions of the peg inside the corresponding insert. Thus, since one of the ends of the peg is locked inside a blade platform, there is no risk of the peg becoming disengaged from the platforms of the blades in the event of a very large displacement between the platforms of the blades. Such a damper having locking means is thus particularly suitable for rotor wheels in which there is a high risk of large displacements occurring between the platforms of the blades.

Under such circumstances, one of the spherical portions of the peg may have a key-forming projection suitable, when the peg is turned, for coming into tangential abutment against a rim of the corresponding insert so as to lock said spherical portion of the peg inside said insert. The damper may then include means for preventing the other spherical portion of the peg from turning inside the corresponding insert.

According to yet another advantageous arrangement, each of the inserts has a hole of oblong shape inside which the spherical portions of the peg come to bear.

Preferably, the peg is made of metal and the inserts are made of silicon carbide.

The invention also provides a turbine engine rotor wheel element comprising: a pair of adjacent composite-material blades each having an outer platform at a free radial end, the outer platform having a cavity that extends in a direction that is tangential relative to the rotor wheel, the cavities in the outer platforms opening out into adjacent facing edges of the platforms; and a vibration damper as defined above, the damper being arranged between the outer platforms of two blades, the hollow inserts of the damper being housed in the cavities in the outer platforms of the two blades.

The invention also provides a turbine engine rotor wheel having a plurality of elements as defined above. Finally, the invention also provides a turbine engine including at least one such rotor wheel.

BRIEF DESCRIPTION OF THE DRAWINGS

Other characteristics and advantages of the present invention appear from the following description given with reference to the accompanying drawings that show embodiments having no limiting character. In the figures.

DETAILED DESCRIPTION OF EMBODIMENTS

Figure 1:
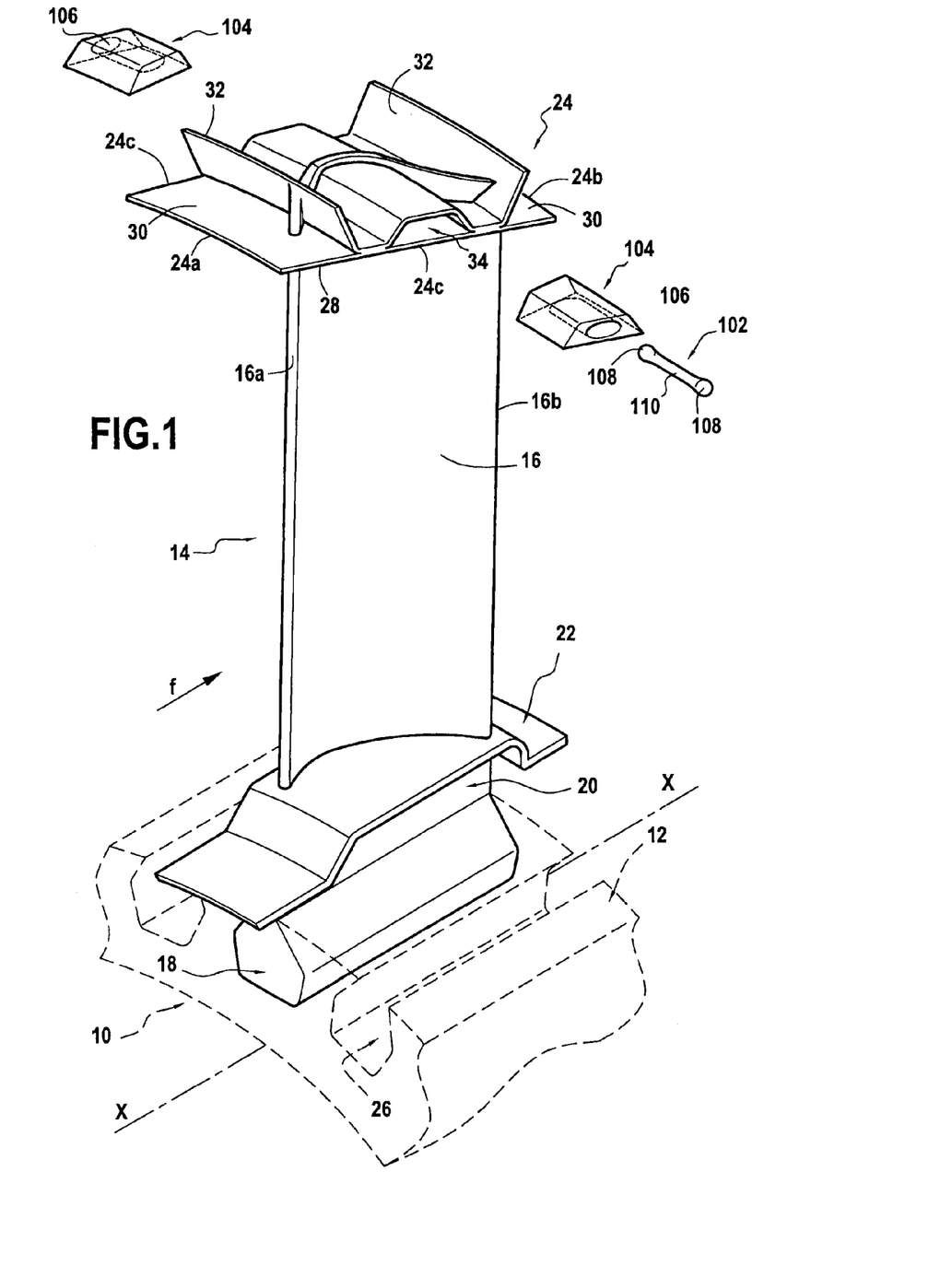
FIG. 1 is a diagram showing how a vibration damper constituting an embodiment of the invention is mounted in the outer platform of a blade made of composite material.

The invention is applicable to various types of turbine engine blade, in particular compressor blades and turbine blades of various gas turbine spools, for example to a rotor wheel blade of a low-pressure turbine stage, such as that shown in FIG. 1.

In well-known manner, the rotor wheel 10 of a low-pressure turbine stage comprises a turbine rotor 12 (shown in part) having an axis of rotation X-X and carrying a plurality of blades 14 that are substantially mutually identical (in terms of composition, mass, dimensions, and geometrical shape). For reasons of simplification, only one blade is shown in FIG. 1.

The blade 14 of FIG. 1 comprises an airfoil 16, a root 18, e.g. having a bulb-shaped section, a tang 20 extending the root, an inner platform 22 situated between the tang and the airfoil, and an outer platform 24 situated in the vicinity of the free end of the blade.

The airfoil 16 extends in a longitudinal direction between the inner and outer platforms 22 and 24 and it presents a curved profile in cross-section between its leading edge 16a and its trailing edge 16b. The blade 14 is mounted on the turbine rotor 12 by engaging its root 18 in a slot 26 of complementary shape formed in the periphery of the rotor.

At its radially outer end, the airfoil 16 connects with the outer platform 24 via an inside face 28 of the platform that defines the outside of the flow passage for the gas stream passing through the turbine. In its upstream and downstream end portions (upstream and downstream being relative to the flow direction f of the gas stream), the outer platform is terminated by overhangs 30. On the outside, the outer platform carries wipers 32 of tooth-shaped profile, with the ends of the wipers being suitable for penetrating into a layer of abradable material of a turbine ring (not shown) in order to reduce the clearance between the tip of the blade and the turbine ring.

The outer platform 24 of the blade is substantially rectangular in shape, with an upstream edge 24a and a downstream edge 24b extending perpendicularly to the flow direction of the gas stream and connected together by two side edges 24c via which the outer platform comes into contact with the outer platforms of two blades of the rotor wheel that are directly adjacent thereto.

The blade shown in FIG. 1 is made of composite material, e.g. of CMC, using a fabrication method such as that described by way of example in French patent application Ser. No. 09/58931 filed on Dec. 14, 2009 jointly by Snecma and Snecma Propulsion Solide, the content of which is incorporated herein by reference.

The method described in that patent application presents the feature whereby the fiber blank that is made by three-dimensional weaving is shaped in order to obtain a single-piece fiber preform having a first portion forming a preform for the blade airfoil 16 and root 18, a second portion forming a preform for the inner platform 22 or the outer platform 24, and a third portion forming a preform for reinforcing the inner platform or a preform for the overhangs 30 of the outer platform. Thus, after the preform has been densified, a composite-material blade is obtained having fiber reinforcement constituted by the preform and densified by the matrix, thereby forming a single part having inner and/or outer platform(s) incorporated therein.

Naturally, other methods of fabricating a composite-material blade may be used for making the blades.

In operation, the blades 14 of the rotor wheel 10 are subjected to vibration that needs to be damped. For this purpose, provision is made for vibration dampers to be housed between the outer platforms of adjacent blades.

With reference to FIGS. 1 to 4, 5A, and 5B, there follows a description of a first embodiment of a vibration damper of the invention.

Each vibration damper 100 in this first embodiment comprises in particular a peg 102 and two hollow inserts 104 that are housed in cavities 34 that are formed facing each other in the outer platforms 24 of two adjacent blades of the rotor wheel. Each peg 102 is interposed transversely between the outer platforms of two adjacent blades.

Figures 2, 4:
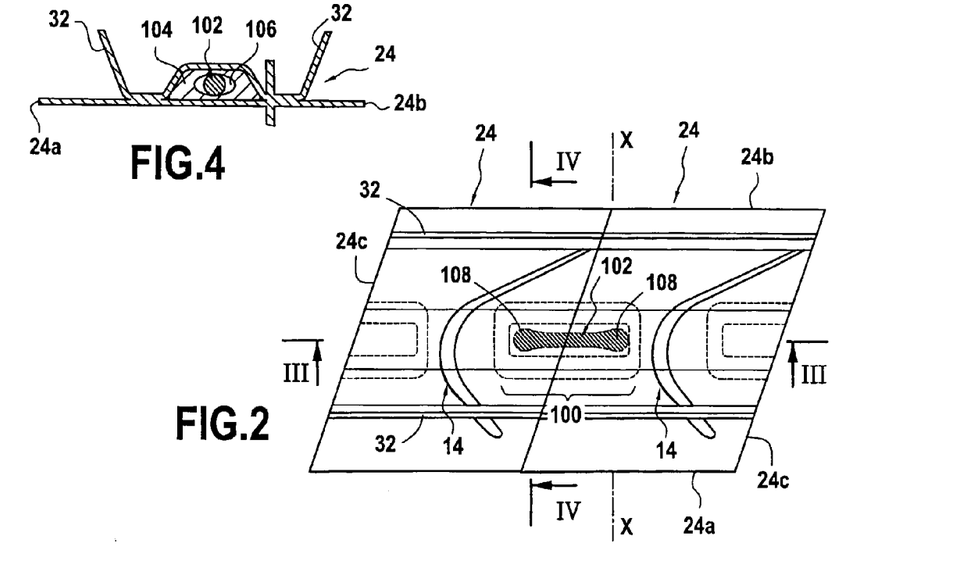
FIG. 2 is a plan view of two adjacent blades with the FIG. 1 vibration damper between the outer platforms of the blades.
FIGS. 3 and 4 are section views of FIG. 2, respectively on and IV-IV.
Figure 3:
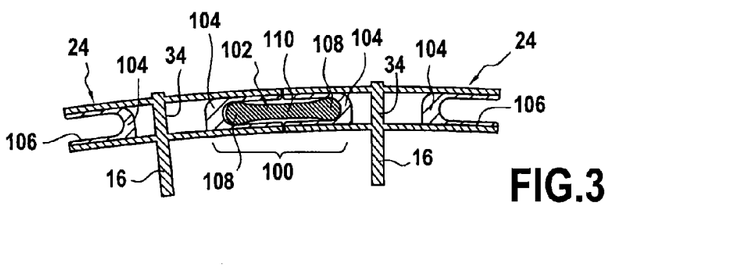

The cavities 34 formed in the outer platforms of the blades extend angularly (i.e. in a direction that is substantially circumferential relative to the rotor wheel) so that each of them opens out into one of the side edges 24c of the outer platform of a blade. Furthermore, they preferably extend axially between the two wipers 32 of the outer platforms.

The inserts 104 are made of composite material, e.g. of sintered silicon carbide. They are advantageously obtained by three-dimensionally weaving a fiber blank that is shaped in order to obtain a preform having the desired shape. During the process of fabricating a blade, these insert preforms are inserted circumferentially between the two layers of the fiber preform forming a preform for the outer platform and a preform for the overhangs of the outer platform, with the outer layer being deformed and with the inner layer being left unchanged (so as to avoid modifying the flow passage for the gas stream). The assembly is then densified and holes 106 of oblong shape are formed in each of the inserts 104 in order to receive a respective peg 102.

The pegs 102 may be made of metal, for example. A peg is axially symmetrical and presents a respective substantially spherical portion 108 at each of its two ends, these spherical portions 108 being interconnected by a central portion 110 of smaller diameter. Each of the spherical portions 108 bears via point contacts against the inside of a hole 106 in an insert 104 (where such point contact results from the oblong shape of the holes 106 in the inserts and from the spherical shape of the ends of the pegs—see FIG. 4).

In operation, under the effect of centrifugal force, the spherical portions 108 of the pegs 102 that make point contact with the insides of the inserts 104 rub against the walls of the oblong holes 106, thereby dissipating the vibratory energy that results from rotation of the wheel.

Figure 5A:
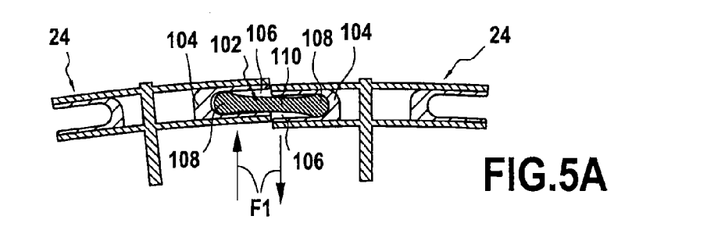
FIGS. 5A and 5B show how the FIG. 1 vibration damper responds respectively in the event of the blades becoming offset radially and in the event of the blades becoming spaced apart.

As shown in FIG. 5A, contact between the spherical portions of the pegs and the insides of the inserts serving to dissipate vibratory energy is maintained continuously, even in the event of large radial offsets (also referred to as displacements, represented diagrammatically by arrows F1 in FIG. 5A) between the outer platforms of two adjacent blades.

Figure 5B:
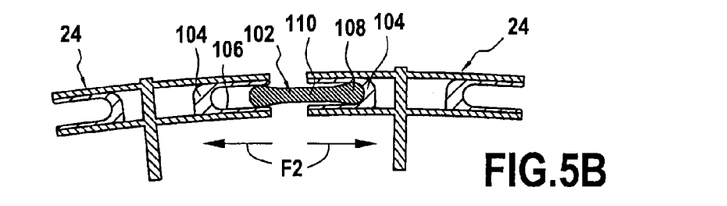
Figure 6:
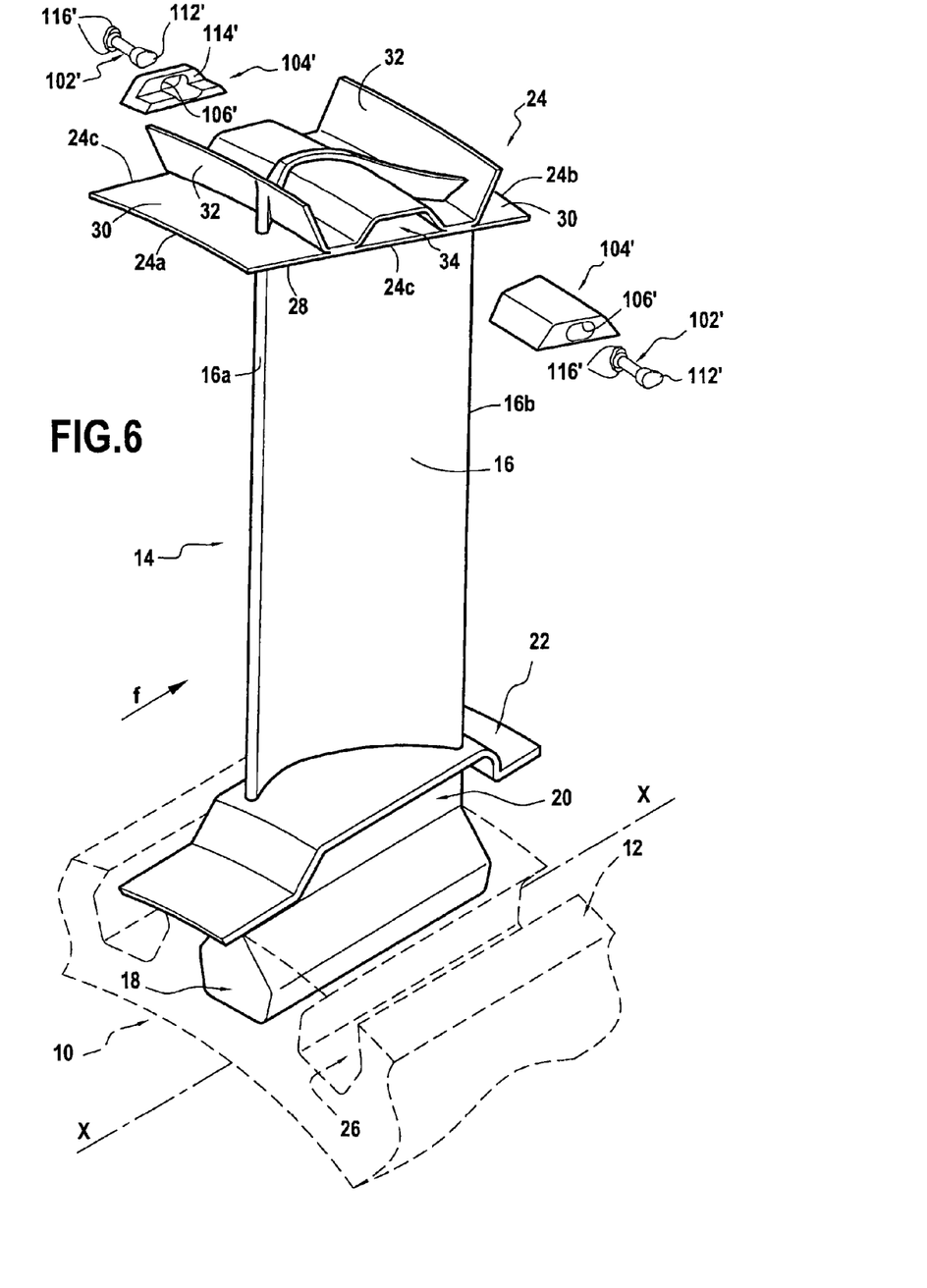
FIG. 6 shows how a vibration damper in another embodiment of the invention is mounted in the outer platform of a blade made of composite material.
Figure 7:
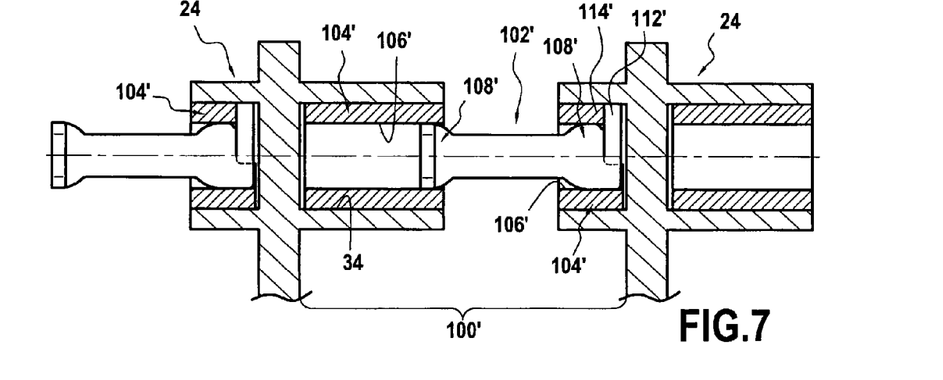
FIG. 7 is a section view through two adjacent blades with the FIG. 6 vibration damper between the outer platforms of the blades.

Likewise, as shown in FIG. 5B, the pegs 102 can bridge large spacings apart (in the tangential direction) between the outer platforms of two adjacent blades (spacing represented by arrows F2 in FIG. 5B). Such spacings can be the result of blades tilting in mutually opposite directions. Nevertheless, given that each peg 102 is free to become disengaged from the inserts 104 in which it is mounted, it is appropriate in this embodiment to ensure that each peg is of a length that corresponds to about 2.5 to 3 times the maximum spacing to which the outer platforms of two adjacent blades can be subjected.

Each peg 102 possesses mass lying in the range 2% to 6%—and preferably equal to 5%—of the mass M of the blade 14 in which an insert 104 is mounted (i.e. the mass M is equal to the mass of the blade plus the mass of a damper insert 104). This amount of mass enables the pegs to perform their vibration damper function properly.

It should also be observed that the inserts make it possible in operation to avoid the metal pegs giving rise directly to wear of the CMC blade platforms between which they are mounted.

With reference to FIGS. 6 to 8, 9A, and 9B, there follows a description of a second embodiment of a vibration damper of the invention. Only the differences relative to the first embodiment are described in detail below.

This second embodiment differs from the first in particular in that locking means are provided for locking one of the spherical portions of a peg inside the corresponding insert.

Figure 8A:
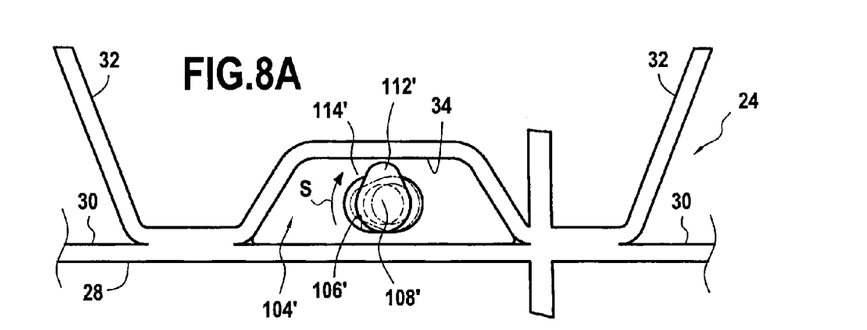
FIGS. 8A and 8B are side views of an outer platform of a blade showing how the FIG. 6 damper is locked and prevented from turning.
Figure 8B:
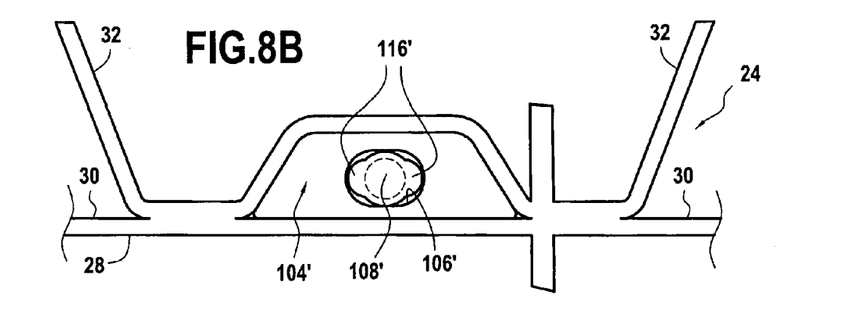

For this purpose, the peg 102' of the vibration damper 100' has a key-forming projection or abutment 112' projecting from one of its spherical portions 108', the projection being of a dimension that enables it to pass into the insides of oblong holes 106' formed in the inserts 104' (FIG. 8A).

Furthermore, the insert 104' receiving this keyed spherical portion of the peg has a rim 114' against which the projection 112' can come into axial abutment. In the example shown in FIG. 6 in particular, this rim 114' of the insert is formed by an indent formed in the end of the insert.

The peg is locked in the insert as follows. The spherical portion 108' of the peg 102' having the projection 112' is inserted through the oblong hole 106' of the corresponding insert. Once the peg is fully inserted in the insert, it is turned through one-fourth of a turn about its longitudinal axis (in the direction of arrow S in FIG. 8A) so as to enable the projection to come into tangential abutment against the rim 114' of the insert (see also FIGS. 9A and 9B). The peg 102' is then locked in the insert 104': its spherical portion having the projection 112' can no longer become disengaged therefrom without being turned once more through one-fourth of a turn in the opposite direction. Once the peg has been locked in this way, its other end is inserted into the insert 104' housed in the cavity 34 formed in the outer platform of the adjacent blade.

Compared with the first embodiment, the vibration damper of this second embodiment of the invention presents the advantage that there is no longer any risk of the peg becoming disengaged from the outer platforms of the blades in the event of very large amounts of displacement between the outer platforms of the blades. Such a damper provided with such peg locking is thus particularly adapted to rotor wheels in which there is a high risk of a large amount of displacement between the outer platforms of the blades.

The vibration damper in this second embodiment of the invention also advantageously includes means for preventing the other spherical portion of the peg (i.e. the spherical portion of the peg that is not locked) from turning inside the corresponding insert, so as to avoid any untimely turning of the peg that could lead to it becoming disengaged from the outer platforms of the blades.

Such anti-turning means may be implemented by giving the spherical portion of the peg a shape that enables it to slide inside the oblong hole 106' of the corresponding insert 104', while preventing it from being able to turn about its longitudinal axis. Thus, in the example shown in FIG. 8B, the spherical portion 108' of the peg has two swellings 116' giving it a right section that is no longer circular, such that when in the position shown in FIG. 8B, the spherical portion of the peg can no longer turn about the axis of the peg in the oblong hole 106' of the insert.

The damper 100' of this second embodiment of the invention damps vibration by the spherical portions of the peg rubbing under the effect of centrifugal force against the walls of the oblong holes in the insert, with this rubbing thus dissipating the vibratory energy that results from rotation of the wheel.

Figure 9A:
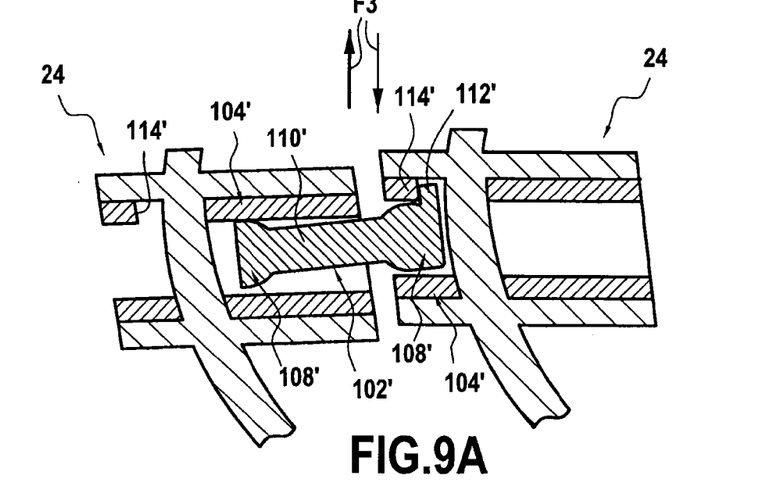
FIGS. 9A and 9B show how the FIG. 6 vibration damper responds respectively in the event of the blades being spaced apart axially and in the event of the blades being spaced apart tangentially.

As shown in FIG. 9A, the contact between the spherical portions of the peg and the insides of the inserts serving to dissipate vibratory energy is contact that is continuous, in particular in the event of the outer platforms of two adjacent blades being spaced apart axially (where such spacing may be the result of the blades tilting mutually, as represented by arrows F3 in FIG. 9A).

In the extreme position shown in FIG. 9A, it can be seen that the oblong holes 106' of the inserts 104' are dimensioned to avoid any contact that could give rise to harmful interference between the central portion 110' of the peg and the walls of the holes in the inserts.

Figure 9B:
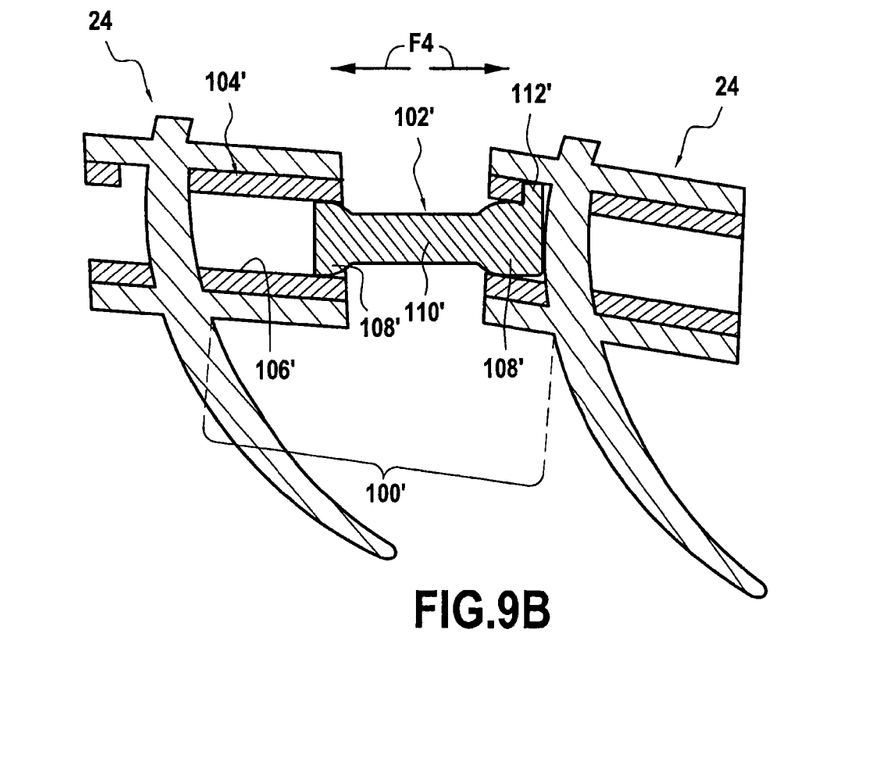

Similarly, as shown in FIG. 9B, the pegs 102 may bridge large spacings (in the tangential direction) between the outer platforms of two adjacent blades. Such a spacing, that may result from mutual tilting of the blades in opposite directions, is represented by arrows F4 in FIG. 9B.

It should be observed that each peg 102' of the vibration damper 100' in this second embodiment possesses mass that lies in the range 2% to 6%—and that is preferably equal to 5%—of the mass M of the blade 14 in which an insert 104' is mounted (i.e. the mass M is equal to the mass of the blade plus the mass of a damper insert 104'). This amount of mass enables the pegs to perform their vibration damper function properly.

The invention claimed is:

1. A vibration damper between outer platforms of adjacent composite-material blades of a turbine engine rotor wheel, the damper comprising:
    a peg having a substantially spherical portion at each of its two ends;
    two hollow inserts for being received in tangential cavities that are provided facing each other in outer platforms of two adjacent composite-material blades of a turbine engine rotor wheel, each spherical portion of the peg coming to bear with point contact against the inside of one of the inserts; and
    locking means for locking one of the spherical portions of the peg inside the corresponding insert.

2. A damper according to claim 1, wherein one of the spherical portions of the peg includes a key-forming projection configured, when the peg is turned, to come into tangential abutment against a rim of the corresponding insert so as to lock the one spherical portion of the peg inside the insert.

3. A damper according to claim 2, further comprising means for preventing the other spherical portion of the peg from turning inside the corresponding insert.

4. A damper according to claim 1, wherein mass of the peg lies in a range 2% to 6% of mass of the blade having an insert mounted therein.

5. A damper according to claim 1, wherein mass of the peg corresponds to 5% of mass of the blade having an insert mounted therein.

6. A damper according to claim 1, wherein each of the inserts includes a hole of oblong shape inside on which the spherical portions of the peg come to bear.

7. A damper according to claim 1, wherein the peg is made of metal and the inserts are made of silicon carbide.

8. A turbine engine rotor wheel element comprising:
   a pair of adjacent composite-material blades each including an outer platform at a free radial end, the outer platform including a cavity that extends in a direction that is tangential relative to the rotor wheel, the cavities in the outer platforms opening out into adjacent facing edges of the platforms; and
   a vibration damper according to claim 1, the damper being arranged between the outer platforms of two blades, the hollow inserts of the damper being housed in the cavities in the outer platforms of the two blades.

9. A turbine engine rotor wheel element according to claim 8, wherein the blades are made of ceramic matrix composite material.

10. A turbine engine rotor wheel element according to claim 8, wherein the cavities in the outer platforms of the blades extend axially between two sealing wipers of the outer platforms.

11. A turbine engine rotor wheel comprising a plurality of turbine engine rotor wheel elements according to claim 8.

12. A turbine engine comprising at least one turbine engine rotor wheel according to claim 11.

* * * * *